United States Patent

[11] 3,591,059

| [72] | Inventor | Carl L. Stearns<br>Granada Hills, Calif. |
|---|---|---|
| [21] | Appl. No | 805,534 |
| [22] | Filed | Mar. 10, 1969 |
| [45] | Patented | July 6, 1971 |
| [73] | Assignee | Riker Laboratories, Inc.<br>Northridge, Calif. |

[54] METERING VALVE WITH AIR SHUTOFF
10 Claims, 12 Drawing Figs.
[52] U.S. Cl. .................................................. 222/402.20, 222/453
[51] Int. Cl. .................................................. B65d 83/14, G01f 11/38
[50] Field of Search .......................................... 222/402.20, 453

[56] References Cited
UNITED STATES PATENTS
3,142,420   7/1964   Gawthrop .................... 222/402.2 X
FOREIGN PATENTS
1,225,163   2/1960   France ........................ 222/402.2

*Primary Examiner*—Robert B. Reeves
*Assistant Examiner*—Frederick R. Handren
*Attorney*—Kinney, Alexander, Sell, Steldt & DeLaHunt ABSTRACT: A valve for use in dispensing a metered amount of an aerosol spray. A valve with a body mounted on the container and a moving stem having a metering chamber and an outlet chamber. A spring urging the stem to a closed position blocking the metering chamber from the atmosphere, with the stem movable to a charge position for charging the metering chamber, with discharge of the metered amount from the metering chamber through the outlet chamber occurring as the stem returns to the closed position.

PATENTED JUL 6 1971 3,591,059

INVENTOR
CARL L. STEARNS
BY HIS ATTORNEYS
HARRIS, KIECH, RUSSELL & KERN

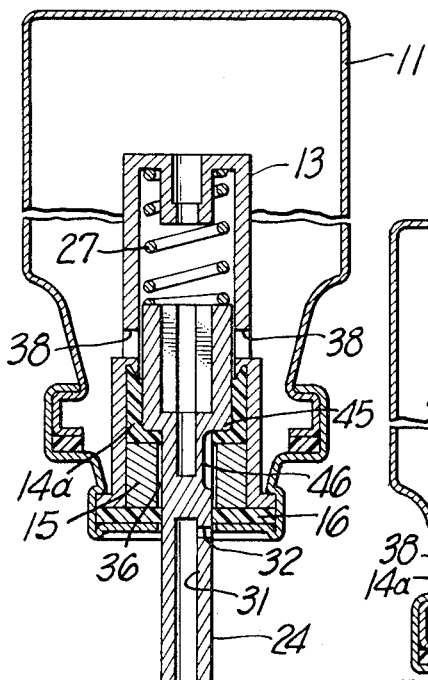
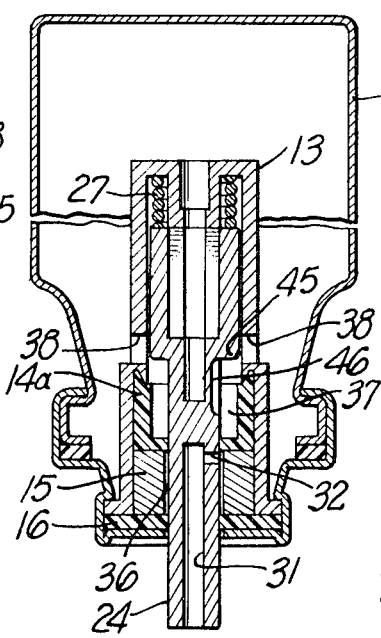
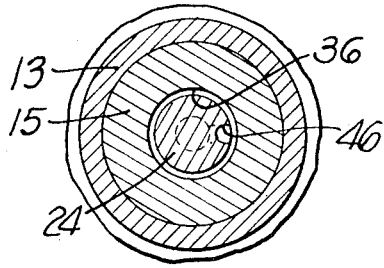
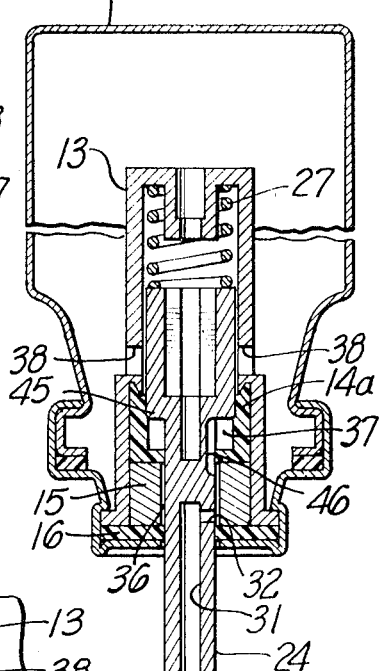
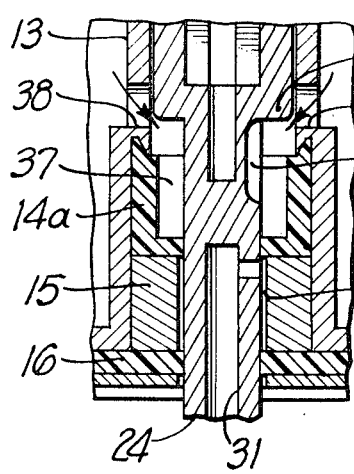
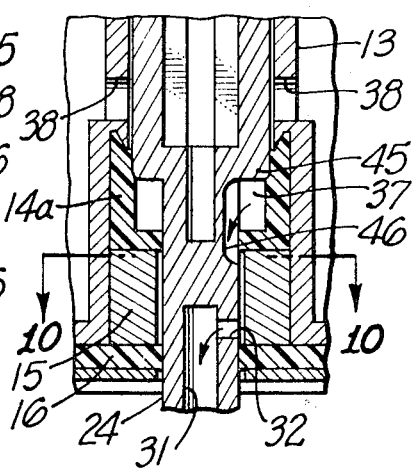

METERING VALVE WITH AIR SHUTOFF

This invention relates to new and improved metering valves especially suited for use with aerosol containers for dispensing aerosol sprays in predetermined amounts. Typical prior art metering valves and dispensing apparatus are illustrated and described in U.S. Pat. Nos. 2,980,301 and 3,001,524. Metering valves of this general type are used in dispensing a wide variety of materials including insecticides, toiletries, and medicaments. It is an object of the present invention to provide a new and improved metering valve which can be utilized as a substitute for the presently used valves and for other purposes.

In the prior art valves, the stem is moved against the spring action to bring the metering chamber of the stem into communication with the interior of the container and a charge or dose of the aerosol material is accumulated in the metering chamber. The stem is then released and moves to the rest or discharge position at which time the metering chamber is blocked from the interior of the container and is brought into communication with the atmosphere, with the contents of the metering chamber being discharged through the outlet passage or chamber.

The valve remains in the discharge or rest position until the next dose is desired.

While in this rest condition, atmospheric air migrates into the metering chamber, with the quantity of air moving to the metering chamber being a function of the time lapse between dispensing operations. It has been found that this air migration produces a variation in dose or charge dispensed by the metering valve.

It is an object of the present invention to provide a new and improved metering valve which eliminates dose variation. This is achieved by providing a valve wherein the metering chamber is blocked from the atmosphere when the valve is in the rest position, which is referred to herein as the closed position. The valve is uniquely designed such that discharge occurs while the valve is moving from the charge to the closed position, with the metering chamber in communication with the atmosphere for a period of time during valve movement to accomplish the dispensing operation. In the embodiments illustrated, additional structural features are incorporated to further eliminate variable dosages and produce a metering valve with substantially constant outputs under a variety of operating conditions. The inlet openings to the metering chamber are designed to reduce or eliminate flash evaporation of the container fluid. The valve body and stem are designed to provide an initially rapid stem movement after charging to seal off the metering chamber from the container, and a subsequent slower stem movement to provide adequate time for full discharge of the metered dose.

These and other novel details of construction and novel combinations and arrangements of parts will more fully appear in the course of the following description. The drawings merely show, and the description merely describes embodiments of the present invention which are given by way of illustration or example. In the drawings:

FIGS. 7-12 are views corresponding to FIGS. 1—6, respectively, showing an alternative and presently preferred embodiment of the invention.

Figure 1:
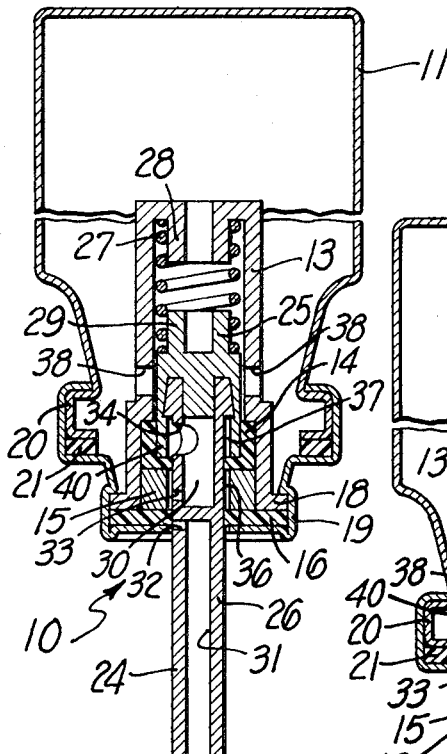
FIG. 1 is a vertical sectional view of an aerosol container incorporating an embodiment of the metering valve, with the valve in the closed position.
Figure 2:
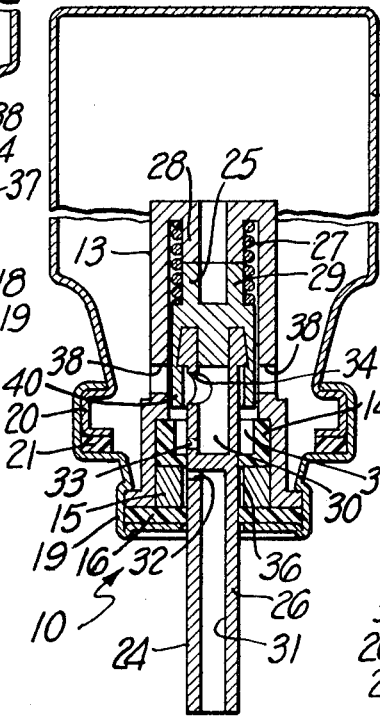
FIG. 2 is a view similar to that of FIG. 1 showing the valve in the charge position.
Figure 4:
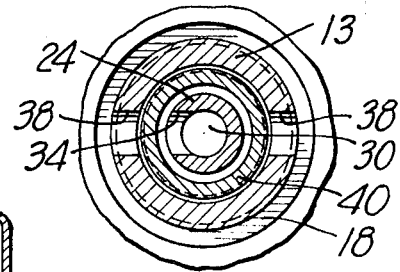
FIG. 4 is a sectional view taken along the line 4—4 of FIG. 3.

Referring to the embodiment of FIGS. 1—6, a valve indicated generally at 10 is mounted on a container 11. Various arrangements may be utilized for mounting the valve and a typical installation is illustrated. The valve comprises a body which is fixed relative to the container and a stem which moves relative to the valve body and the container.

In the embodiment illustrated, the valve body includes a shell 13 of relatively rigid plastic or metal, a cup seal 14 of resilient material, a spacer 15 of a rigid material, and a gasket 16 of resilient material. A flange 18 of the shell 13 is clamped against the gasket 16, with the seal 14 and spacer 15 therebetween, by a sleeve 19. The sleeve 19 typically is made of a malleable metal which permits forming the sleeve around the shell and gasket as illustrated, to produce the clamping action. The sleeve 19 is also formed about the mouth 20 of the container 11, with the gasket 21 therebetween, for mounting the valve on the container and closing the mouth of the container.

The valve stem 24 as illustrated in the drawing, is formed of two molded plastic parts 25, 26, but other forms may be utilized if desired. A spring 27 is positioned within the body shell 13 around a boss 28 on the shell and around a boss 29 on the stem, for urging the stem toward the closed position of FIG. 1.

A metering chamber 30 and outlet chamber 31 are provided in the stem 24. A lateral opening 32 is provided in the stem for the outlet chamber 31. Lateral openings 33 and 34 are provided in the stem for the metering chamber 30.

The cup seal 14, the spacer 15 and the gasket 16 coact to define a bypass zone 36 within the valve body around the stem. The body shell 13 and the cup seal 14 coact to define a charge zone 37 within the valve body about the stem. Openings 38 in the shell 13 provide communication between the interior of the container and the charge zone 37. An annular flange 40 may be provided on the stem member 25.

The valve is shown in the closed or rest position in FIG. 1. To initiate a dispensing operation, the stem is pushed inward to the charge position of FIGS. 2 and 3, compressing the spring 27. A quantity of the fluid in the container flows into the metering chamber 30 through the shell openings 38, the charge zone 37 and the stem openings 33, 34.

Figure 5:
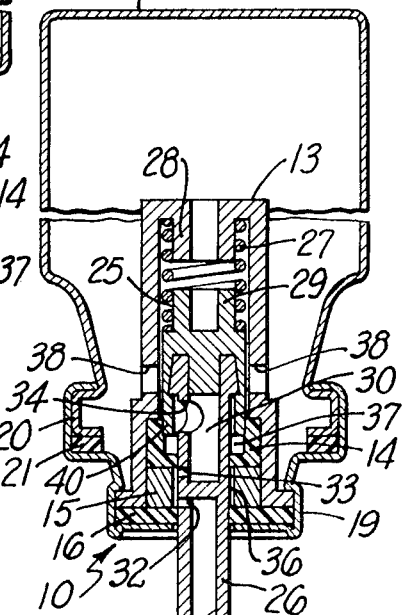
FIG. 5 is a view similar to that of FIG. 1 showing the valve in the discharge position.
Figure 3:
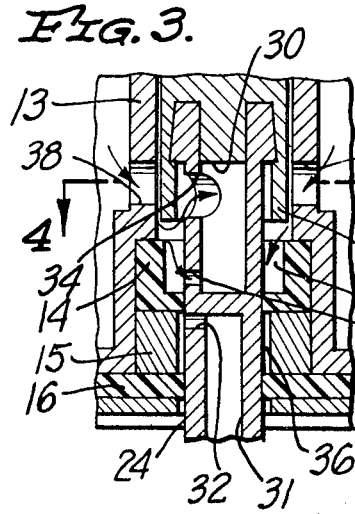
FIG. 3 is an enlarged partial sectional view of the valve of FIG. 2.
Figure 6:
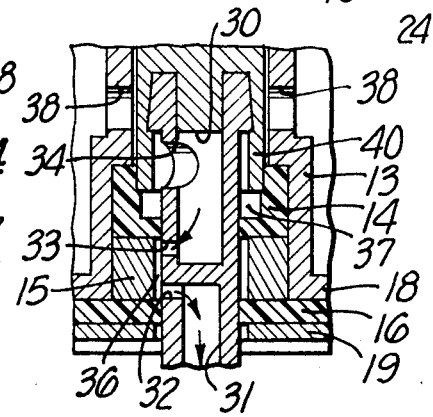
FIG. 6 is an enlarged partial sectional view of the valve of FIG. 5.

The stem is released and the action of the spring moves the stem through the discharge position of FIG. 5 and 6 to closed position of FIG. 1. The stem initially moves at a relatively fast rate, bringing the flange 40 into engagement with the resilient seal 14. Engagement of the flange and seal closes the charge zone 37. The flange 40 and seal 14 preferably are dimensioned so that there is a frictional engagement which slows down the stem movement, providing sufficient time for discharge of the metered dose.

As the stem moves through the discharge position, the fluid in the metering chamber 30 flows to the atmosphere through the opening 33, the bypass zone 36, the opening 32, and the outlet chamber 31, as shown by the arrows in FIG. 6.

When the stem arrives at the closed position of FIG. 1, the opening 32 of the outlet chamber 31 no longer communicates with the bypass zone 36, and the metering chamber 30 is blocked from the atmosphere. With this structural arrangement, the metering chamber is in communication with the atmosphere for substantially the same length of time at each dispensing operation. This arrangement substantially eliminates variation in dosage due to atmospheric air entering the metering chamber.

The opening 34 in the metering chamber preferably is made larger than the opening 33, preferably in the order of about 1½ times greater in area. This larger opening suppresses or eliminates flash evaporation of the container fluid and allows the metering chamber to fill more rapidly and uniformly.

It will readily be recognized that the particular placement of the valve relative to the container and the particular location of the spring relative to the stem are primarily matters of design and that a variety of modifications, including those illustrated in the prior art, may be incorporated in other embodiments of the invention.

An alternative and presently preferred embodiment of the metering valve is illustrated in FIGS. 7—12, which figures correspond to FIGS. 1—6, respectively, with corresponding elements being identified by the same reference numerals.

The difference between the embodiment of FIGS. 1—6 and the embodiment of FIGS. 7—12 is principally in the construction of the valve stem 24. The cup seal 14a and its engagement with the shell 13, as shown in FIG. 7, is slightly different from the configuration of the cup seal 14 of FIG. 1. However the purpose and mode of operation is substantially the same. The metering chamber 30 is omitted from the valve stem 24 of the embodiment of FIG. 7. The inner end of the stem includes an annular shoulder 45 which engages the cup seal 14a in the same manner as the flange 40 of the embodiment of FIG. 1. A passage 46 is provided along the surface of the stem 24, to provide communication between two axially spaced points.

In the operation of the valve of FIG. 7, the charge zone 37 serves as the chamber in which the dose is collected and measured. The expression dose chamber as used in the specification and claims refers to the charge zone 37 of the embodiment of FIG. 7 and to the metering chamber 30 and the charge zone 37 of the embodiment of FIG. 1.

When the stem is pushed inward to the charge position of FIGS. 8 and 9, fluid from the container 11 flows through the openings 38 in the shell 13 into the charge zone 37. The charge zone is blocked from the outlet chamber 31 of the stem during the charging operation.

When the stem is released, the spring 27 moves the stem to the intermediate position of FIGS. 11 and 12, and on to the closed position of FIG. 7. When in the intermediate position, the shoulder 45 of the stem engages the seal 14a and blocks communication between the container and the charge zone. At the same time, communication is provided between the charge zone and the outlet chamber 31 of the stem through the passage 46, the bypass zone 36 and the outlet openings 32.

When the stem reaches the closed position, the charge zone 37 is substantially filled by the stem and remains blocked from the interior of the container. The charge zone is also blocked from the outlet chamber by the gasket 16, providing complete isolation of the various zones and chambers.

I claim:

1. In a metering valve for dispensing a quantity of fluid from a container, the combination of:
   a valve stem having an outlet chamber with an outlet opening;
   a valve body adapted for mounting on the container in a stationary position with respect to the container and including means for closing the mouth of the container,
   with said valve stem mounted in said valve body for reciprocation between a closed position and a charge position; and
   spring means for urging said valve stem toward said closed position;
   said valve stem and body including first means defining a dose chamber,
   said valve body including second means defining a bypass zone with said body about said stem, and
   with said outlet opening of said stem disposed relative to said bypass zone such that said dose chamber is in communication with the interior of the container and said outlet chamber is blocked from the interior of the container, when said stem is in said charge position, and
   said dose chamber is blocked from said outlet chamber when said stem is in said closed position, and
   said dose chamber is in communication with said outlet chamber through said bypass zone and said outlet opening, and said dose chamber is blocked from the interior of the container, when said stem is intermediate said charge and closed positions.

2. A valve as defined in claim 1 in which said valve body and stem include cooperating elements out of engagement with each other when said stem is in said charge position and in frictional engagement with each other frictional stem moves to said closed position whereby said stem initially moves from said charge position at a first higher velocity and then moves on to said closed position at a second lower velocity on interengagement of said elements.

3. A valve as defined in claim 1 in which said dose chamber includes a metering chamber in said valve stem with a second opening in said stem for communication with said metering chamber.

4. A valve as defined in claim 3 wherein said dose chamber includes a charge zone within said body about said stem and opening to the interior of the container, and
   wherein said valve body and stem include cooperating elements out of engagement with each other when said stem is in said charge position and in engagement with each other as said stem moves to said closed position blocking said charge zone from the interior of the container.

5. A valve as defined in claim 3 wherein said dose chamber includes a charge zone within said body about said stem and opening to the interior of the container, and
   wherein said metering chamber includes a third opening spaced from said second opening,
   with said metering chamber in communication with the interior of the container through said second and third openings and said charge zone when said stem is in said charge position.

6. A valve as defined in claim 5 in which said second opening is disposed intermediate said outlet and third openings, and in which said third opening is larger than said second opening.

7. A valve as defined in claim 1 in which said dose chamber includes a charge zone within said body about said stem and opening to the interior of the container, and
   wherein said valve body and stem include cooperating elements out of engagement with each other when said stem is in said charge position and in engagement with each other as said stem moves to said closed position blocking said charge zone from the interior of the container.

8. A valve as defined in claim 7 wherein said stem includes a passage between two points axially spaced along the surface of said stem providing communication between said charge zone and said bypass zone when said stem is intermediate said charge and closed positions.

9. In a metering valve for dispensing a quantity of fluid from a container, the combination of:
   a valve stem having an outlet chamber with a first opening and having a metering chamber with second and third openings, with said openings positioned sequentially along said stem and with said third opening larger than said second opening;
   a valve body adapted for mounting on the container and including means for closing the mouth of the container,
   with said valve stem mounted in said valve body for reciprocation between a closed position and a charge position; and
   spring means for urging said valve stem towards said closed position;
   said valve body including first means defining a charge zone within said body about said stem and opening to the interior of the container, and second means defining a bypass zone within said body about said stem, and
   with said valve body and stem including cooperating elements out of engagement with each other when said stem is in said charge position and in engagement with each other as said stem moves to said closed position for closing said charge zone from the interior of the container, and
   with said openings in said stem disposed relative to said zones such that said metering chamber is in communication with the interior of the container through said second and third openings and said charge zone, and said outlet chamber is blocked from the interior of the container, when said stem is in said charge position, and said metering chamber is blocked from the interior of the container and from said outlet chamber when said stem is in said closed position, and said metering chamber is in communication with said outlet chamber through said second opening, said bypass zone and said first opening, and said metering chamber is blocked from the interior of the container, when said stem is intermediate said charge and closed positions.

10. In a metering valve for dispensing a quantity of fluid from a container, the combination of:

a valve stem having an outlet chamber with an outlet opening;

a valve body adapted for mounting on the container and including means for closing the mouth of the container, with said valve stem mounted in said valve body for reciprocation between a closed position and a charge position and including a passage providing communication between two points axially spaced along the surface of said stem; and spring means for urging said valve stem towards said closed position;

said valve body including first means defining a charge zone within said body about said stem and opening to the interior of the container, and second means defining a bypass zone within said body about said stem, and with said valve body and stem including cooperating elements out of engagement with each other when said stem is in said charge position and in engagement with each other as said stem moves to said closed position for closing said charge zone from the interior of the container, and with said outlet opening and passage of said stem disposed relative to said zones such that said charge zone is in communication with the interior of the container, and said outlet chamber is blocked from the interior of the container, when said stem is in said charge position, and said charge zone is blocked from the interior of the container and from said outlet chamber when said stem is in said closed position, and said charge zone is in communication with said outlet chamber through said passage, said bypass zone and said outlet opening, and said charge zone is blocked from the interior of the container, when said stem is intermediate said charge and closed positions.

UNITED STATES PATENT OFFICE
CERTIFICATE OF CORRECTION

Patent No. 3,591,059　　　　　　　　　Dated　July 6, 1971

Inventor(s)　Carl L. Stearns

It is certified that error appears in the above-identified patent and that said Letters Patent are hereby corrected as shown below:

Column 3, line 59, "with" should read -- within --; line 61, after "is" insert -- in --; line 75, "frictional", second occurrence, should read -- as --.

Signed and sealed this 8th day of February 1972.

(SEAL)
Attest:

EDWARD M. FLETCHER, JR.　　　　　　ROBERT GOTTSCHALK
Attesting Officer　　　　　　　　　　Commissioner of Patents